United States Patent
Poradish et al.

(10) Patent No.: US 6,856,464 B1
(45) Date of Patent: Feb. 15, 2005

(54) COLOR SPLITTING APPARATUS AND METHOD WITH UNEQUAL GLASS PATH LENGTHS

(75) Inventors: Frank J. Poradish, Plano, TX (US); Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/747,667

(22) Filed: Dec. 29, 2003

(51) Int. Cl.[7] .................. G02B 27/14; G02B 27/10; G03B 21/00; G03B 21/28

(52) U.S. Cl. .................. 359/634; 359/618; 359/629; 359/638; 359/833; 353/33; 353/81

(58) Field of Search ................... 359/618, 629, 359/634, 638–640, 831, 833, 836; 353/33, 81; 356/19, 136, 137

(56) References Cited

U.S. PATENT DOCUMENTS 6,456,447 B1 * 9/2002 Sato ........................ 359/834

* cited by examiner

*Primary Examiner*—Hung Xuan Liang
*Assistant Examiner*—Joseph Martinez
(74) *Attorney, Agent, or Firm*—Charles A. Brill; Wade James Brady, III; Frederick J. Telecky, Jr.

(57) ABSTRACT

A three element prism system and method for splitting/combining three different colors of light arranged such that the size of a selected one of the color prism, such as for example, the red prism and, consequently the clear aperture, are increased without a corresponding increase in the size of the other prisms (e.g., the blue and green prisms). This is accomplished by adjusting the air gap $A_2$ of the selected light path (e.g., red) so that the effective total selected light path T, which includes the selected light air gap $A_2$ and the selected light glass path $G_2$ is the same as the total path length T of both the other light paths (e.g., green and blue) comprised of air gap $A_1$ plus glass path $G_1$.

29 Claims, 2 Drawing Sheets

COLOR SPLITTING APPARATUS AND METHOD WITH UNEQUAL GLASS PATH LENGTHS

TECHNICAL FIELD

The present invention relates to color splitting/combining prism systems and more particularly to apparatus and methods for increasing the size of the clear aperture of one of the channels. For example, the size of the red channel clear aperture may be increased without a similar increase in the blue channel clear aperture and green channel clear aperture. This will minimize overall glass content and cost.

BACKGROUND

Many display systems use multiple spatial light modulators, such as liquid crystal display panels (LCD's) or digital micromirror devices (DMD™) to create a single full color image. Generally, a white light source is used to create a white light beam that is split, using dichoric filters, into three primary color light beams. Each primary color light beam is incident on a separate modulator and the three modulated primary color light beams are recombined to form a single full color image on a display surface.

However, as will be appreciated by those skilled in the art, color splitting/combining prisms as typically used with spatial light modulators have equal glass path lengths through the prism system in order to promote lens design symmetry and picture quality. Further, the size of the prism arrangement is determined by optimizing the dichoric angles for the desired color with matching path lengths and then scaling the overall size of the prism to fit the size of the device being imaged. Since the red channel typically has the narrowest clear aperture, it is typically the red channel therefore that determines or sets the overall size of the prism arrangement that will be required for a particular image size. Once the size of the prism arrangement is set as required by the red channel, it will be appreciated that the blue and green channels will have larger clear apertures than that of the red channel and could handle larger images. Unfortunately, an acceptable image cannot be generated if the image size of the red channel is different than that of the green and blue channels.

Therefore, if the red channel clear aperture could be increased to be as large or equal to the clear aperture available with the blue and green channels, optimally sized prism arrangements with minimal glass content and, consequently, minimal cost, could be appreciated.

SUMMARY OF THE INVENTION

These and other problems are generally solved or circumvented, and technical advantages are generally achieved, by preferred embodiments of the present invention, which provides for methods and apparatus for a three-element prism system for projecting three different colors of light onto a single display surface. According to one embodiment of the invention, the prism system comprises first and second prism elements for providing light having first and second colors respectively (such as, for example, green and blue colors) wherein both green and blue colors have a first air gap $A_1$ of the same length, and a first glass path length $G_1$ of the same length for a total path length T, where T equals $A_1$ plus $G_1$. The system further includes another or third element for receiving light having a third color (red, in the present example) that has a second and different air gap length $A_2$ and a second and different glass path length $G_2$ for a total path length T that is the same as the total path length for the green and blue colors. Therefore, $A_2+G_2=T=A_1+G_1$. Although the invention is discussed with respect to three colors, such as red, green and blue, it will be appreciated that the principles of this invention are equally applicable to a two prism, two color system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
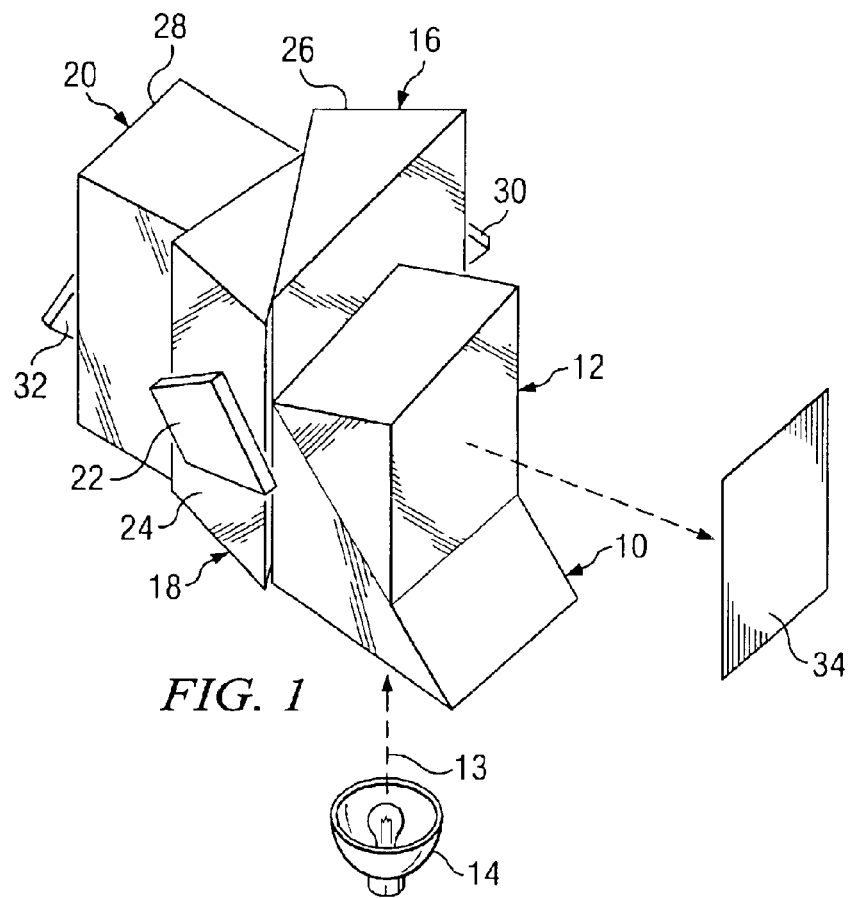
FIG. 1 is a perspective view of a three light modulator prism system for receiving illumination from a light source and for projecting three color images onto a display surface.

Referring to FIG. 1, a prism arrangement for illuminating three different light modulators and then projecting the modulated light onto a display surface is shown. The invention is described with respect to the use of three DMD™ (digital micromirror devices) light modulators, although the prism system as disclosed could also be used with three liquid crystal display (LCD) panels serving as light modulators. In the embodiment discussed, a DMD™ light modulator is associated one each with the colors red, green and blue. According to the embodiment of FIG. 1, the prism arrangement includes five distinct prisms. Two of the prisms 10 and 12 are used to direct white light 13 from the light source 14 to the color splitting/combining prism arrangement comprising a prism 16 for blue light, a prism 18 for red light and a prism 20 for green light. As will be appreciated by those skilled in the art, the size of the color splitting/combining prisms 16, 18 and 20 are determined by optimizing the dichoric angles for the desired color and then scaling the size of the prism arrangement to fit the size of the light image to be received by the prisms. As will also be appreciated by those skilled in the art, although the red channel is typically the channel that needs an increased clear aperture, the teachings of this invention are also applicable to other color channels, such as for example, the blue channel. It will further be appreciated that a two prism (i.e., prisms 16 and 18), two color arrangement is also possible.

Therefore, as shown, light modulator 22 is supported at a selected distance from face 24 of the prism 18 where it can receive a selected color of light. In the following example, prism 18 will receive red light and will be referred to as the "red" prism. The received red light is then modulated and becomes the red light needed to form images on the display surface, and is reflected into prism 18. Red light not needed for the image is reflected away from the prism 18 by the red light modulator 22. In a similar manner, prism face 26 of the blue prism 16 and prism face 28 of the green prism 20 provide blue light and green light, respectively, (when three prisms are used) to modulators 30 and 32, respectively. The blue and green light is modulated in the same manner as discussed with respect to the red light, and the modulated red, green and blue light is then recombined and transmitted back to the light directing prisms 10 and 12. However, the arrangement of prisms 10 and 12 and the light path back through the splitting/combining prisms 16, 18 and 20 is such that the combined red, green and blue modulated light from the three light modulators is not reflected along the same path back toward the light source 14 but the modulated light 33 is instead reflected to a display surface 34.

Therefore, since prisms 10 and 12 are used to provide white light from the source 14 to the color splitting/combining prisms 16, 18 and 20 and to redirect the modulated and combined three colors of light onto display surface 34, it is seen that light directing prisms 10 and 12 are not part of the color splitting/combining function of the prism arrangement and consequently will not be discussed further.

Figure 2:
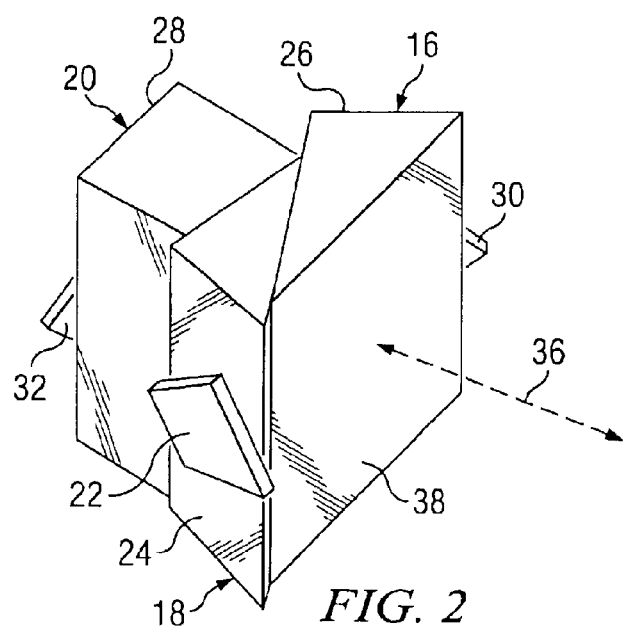
FIG. 2 is a perspective view of the prism system of FIG. 1 without the two light directing prisms.
Figure 3:
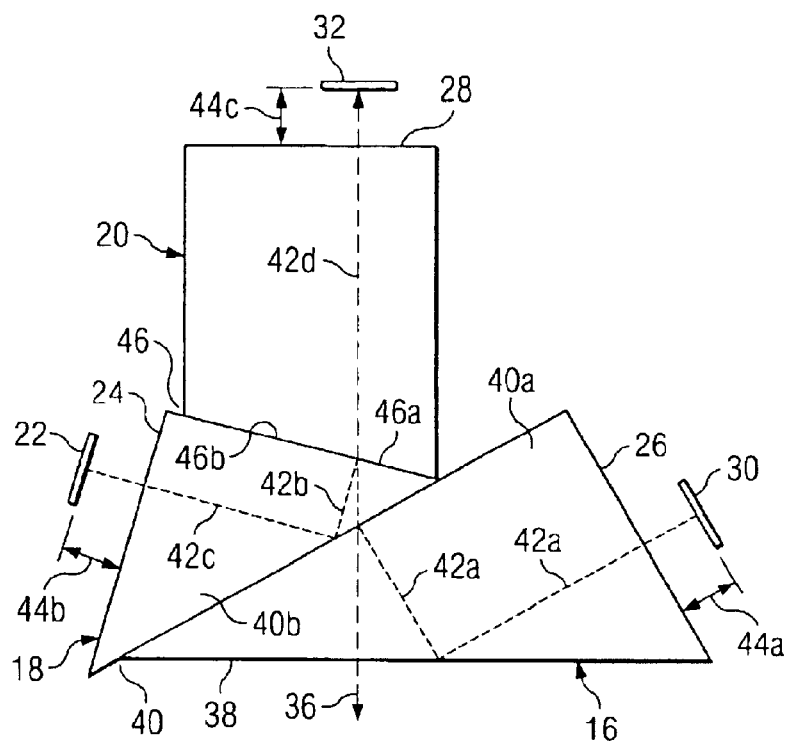
FIG. 3 is a prior art top view of the three color image combining prism arrangement of FIG. 2.

Therefore, referring to FIG. 2, there is illustrated the prism arrangement of FIG. 1 without light directing prisms 10 and 12. FIG. 3 is a prior art diagrammatical top view of the color splitting/combining prism arrangement of FIG. 2 and illustrates how light is split and then recombined by the three prisms in this arrangement.

As shown in FIG. 3, white light 36 generated at source 14 (not shown) is directed to surface 38 of blue prism 16. Then, as indicated by line 36, the white light passes through surface 38 of blue prism 16 and travels to surface 40a of blue prism 16 at the interface 40 located between blue prism 16 and red prism 18. The dichoric angle of surface 40a of blue prism 16 is selected so that blue light is reflected from surface 40a as indicated by a first portion of line 42a back to surface 38. However, the blue light strikes surface 38 at such an angle that it does not exit prism 16 through surface 38 but is again reflected. Then, as indicated by a second portion of line 42a, the blue light is reflected toward face 26 and light modulator 30. Face 26 of prism 16 is designed to be substantially perpendicular to light rays reflected from surface 38 and consequently, the blue light exits surface 26 and travels through an air gap with a selected distance $A_1$ to light modulator 30 as indicated by double headed arrow 44a. The blue light is modulated by light modulator 30 and then follows the path indicated by line 42a to surface 40a where it is reflected along path 36 to surface 38 where it exits prism 16 and is directed to display surface 34 in a reverse direction. It will be understood by those skilled in the art that although the top two dimensional views of the light path appear to be identical in the forward and reverse directions, a three-dimensional view would show that, although the total path length in both the forward and reverse directions are substantially the same, they follow paths that are spaced apart in the third dimension. Thus, the modulated blue light is then recombined with modulated red and green light at surface 40a as will be discussed below and it is the combined modulated red, green and blue light that exits blue prism 16 along line 36 and is directed to display surface 34.

As discussed above, the blue component of the white light from source 14 is reflected at surface 40a of blue prism 16. However, the unreflected red and green light that makes up the original white light passes through surface 40a of blue prism 16, the interface 40 and surface 40b of red prism 18 into red prism 18 as indicated by line path 42b. The red and green light (the blue light has been removed) travels along path 42b until it strikes the surface 46a of red prism 18 at the interface 46 between red prism 18 and green prism 20. The dichoric angle of the red prism at surface 46a is selected so that red light is reflected as indicated by a first portion of line 42c and so that the unreflected green light passes into green prism 20. The red light reflected from surface 46a travels along the first portion of path 42c back toward the surface 40b such that the red light strikes surface 40b at an angle and is totally internally reflected and travels toward prism face 24 along a second portion of path 42c. Since the second portion of path 42c of the red light is substantially perpendicular to prism face 24, the red light exits prism 18 and travels through an air gap between prism face 24 and modulator 22 supported adjacent to prism 24. The length of the air gap between face 24 of red prism 18 and the modulator 22 according to the prior art and as indicated by double headed arrow 44b, is selected to be the same distance $A_1$ as the distance $A_1$ of the air gap between face 26 of the blue prism 16 and modulator indicated by double headed arrow 44a.

Modulated red light is then reflected from modulator 22 along path 42c to surface 46a of red prism 18 where it is combined with modulated green light (to be discussed below) and the combined modulated red and green light then follows path 42b in a reverse direction and passes through surface 40b of red prism 18, interface 40 between red prism 18 and blue prism 16, surface 40a of blue prism 16 and into blue prism 16. Then, as discussed above, the red and green modulated light is combined with the modulated blue light and follows path 36 out of blue prism 16 at surface 38. This combined red-green-blue modulated light will then be projected onto the display surface 34 to form the intended image.

As was mentioned above, after the red and blue light is removed at interfaces 40 and 46 respectively, the remaining green light then travels through green prism 20 to green prism face 28 as indicated by path 42d. The green light then passes through face 28 and travels through an air gap to modulator 32. Modulator 32 reflects the modulated green light back through the air gap and into green prism 20 in a reverse direction along path 42d. Then, as discussed above, the modulated green light is recombined with modulated red light at interface 46 and the combined red and green modulated light is combined with modulated blue light at interface 40 before it passes out of blue prism surface 26 to the display surface 34. As mentioned above, a two prism arrangement (such as prisms 16 and 18) for only two colors could be selected.

It is noted that, according to the prior art, the air gap length or distance $A_1$ between face 28 of green prism 20 and modulator 32 as indicated by double headed arrow 44c is the same as the air gap distance $A_1$ between face 24 of red prism 28 and modulator 22 as indicated by double headed arrow 44b and the air gap distance $A_1$ between face 26 of blue prism 16 and modulator 30 as indicated by double headed arrow 44a.

As will also be appreciated by those skilled in the art, according to this conventional prism arrangement, the glass path length $G_1$ for all colors (such as red, green and blue) are equal. That is, the glass path length $G_1$ of the blue light (paths 36 and 42a) through prism 16 from entry surface 38 to face 26 is the same as the glass path length $G_1$ of red light (paths 36, 42b and 42c), and the path length $G_1$ of green light (paths 36, 42b and 42d). Thus, according to the prior art, the total light path length T starting at entrance face 38 of blue prism 16 to the appropriate red, green or blue modulator for the red light, green light and blue light, is the same. That is, for all colors of light including red, green and blue light, the total path T for each color equals $A_1$ plus $G_1$. Actually, since the red, green and blue light travels in both directions through the air gap and prism arrangement, the total path traveled is actually 2 $(A_1+G_1)$, but to simplify the discussions, T will be considered equal to $A_1$ plus $G_1$.

As was discussed above, the size of the prisms making up a color splitting/combining prism arrangement necessary to handle a selected image size is typically determined by optimizing the dichoric angles of the prism elements for the desired color (for example, red, blue and green), and then equalizing the path length to a constant value. Since in a three prism arrangement the red channel has the smallest or narrowest clear aperture at the prism face 24, according to the prior art it is necessary to select a red prism 18 with a face 24 adjacent to red light modulator 22 that is sufficiently large to receive an image having the selected size. The blue and green prisms must then be scaled as necessary to the red prism. However, the clear aperture for the green and blue prism elements will be noticeably larger than the clear aperture for the red prism element and, therefore, the green and blue prism elements could accommodate a larger image size. Of course, since the blue and green images must be combined with the red image, if a selected full color image is to be displayed on the display surface 34 (not show in FIG. 3), this is not acceptable.

According to the present invention, however, the red prism element can be increased in size without a corresponding size increase in the blue and green prisms. This is achieved by compensating for an increase in the glass path length through the larger red prism by an offsetting decrease in the air space or gap between the red prism face and the modulator.

Figure 4:
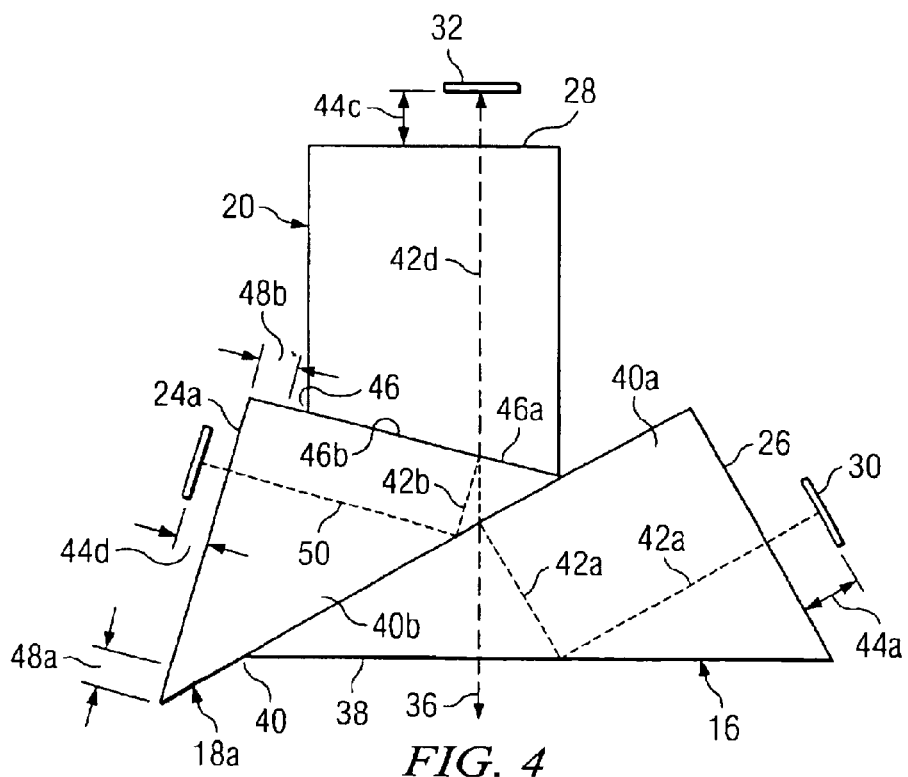
FIG. 4 is a top view of the three color image system comprising prisms according to the present invention.

Referring now to FIG. 4, there is illustrated a prism arrangement that incorporates the teaching of the present invention. As shown, the blue prism and the green prism are identical to the blue and green prisms of the prior art FIG. 3 and, therefore, carry the same reference numbers. Likewise, the length of the air gaps 44a and 44c associated with the blue and green prisms 16 and 20 are also maintained at the same distance $A_1$. Therefore, the total light path length T for blue light and green light is the same as was discussed with respect to FIG. 3. That is, the total path length T for green light still equals $A_1$ plus $G_1$ and for blue light, $T=A_1+G_1$. However, as can be seen, red prism 18a has been increased in size so that the clear aperture along face 24a is also larger as indicated at 48a and can therefore receive a larger image. This means, of course, that glass path 50 from interface 46 to face 24a is also increased by the distance indicated by double headed arrow 48b. This, of course, also means that the total glass path length $G_2$ for red light is increased by an equal amount. Therefore, unlike the prior art, the glass path length $G_2$ for red light is not equal to the glass path length $G_1$ of the blue and green light. However, if the three modulated colors are to be recombined to form a satisfactory image, the three modulated color images should arrive at the display surface 34 (not shown in FIG. 4) at the same time. This is accomplished according to the present invention by adjusting the length of the air gap $A_2$ indicated by double headed arrow 44d so that the total effective path length T for red light is still equal to the total effective path length T of the blue light and green light. For example, $A_2+G_2=T=A_1+G_1$. Therefore, if the glass path $G_2$ for red light is larger than the glass path $G_1$ or green and blue light, then the air gap $A_2$ at 44d for the red light must be decreased such as is shown in FIG. 3.

More specifically, the time for light to travel the path for a first color such as blue light is determined from equation (1)

$$t_b = \frac{n_1 d_1}{c} + \frac{n_1 d_2}{c} \qquad (1)$$

where $n_1$ is the index refraction of the glass making up the blue prism element and $d_1$ is the length of path 36 in the blue prism element, $d_2$ is the light path of both portions of path 42a in the blue prism element and c is the speed of light.

Similarly, the time for light to travel the path for red light is determined from equation (2)

$$t_r = \frac{n_1 d_2}{c} + \frac{n_2 d_3}{c} + \frac{n_2 d_4}{c} \qquad (2)$$

where $n_1$ and $d_1$ are the same as in equation (1), $n_2$ equals the index of refraction for red prism element, $d_3$ equals the length of path 42b in the red prism element and $d_4$ equals the length of path 42c in the red prism element.

Likewise, the time for light to travel the path for green light is determined from equation (3)

$$t_g = \frac{n_1 d_1}{c} + \frac{n_2 d_3}{c} + \frac{n_3 d_5}{c} \qquad (3)$$

where $n_1$, $d_1$, $n_2$ and $d_3$ are the same as in equations (1) and (2), $n_3$ equals the index of refraction of the green prism element and $d_5$ equals the length of path 42d in the green prism element.

If, as is often the case, the index of refraction of the glass used for all of the prisms elements is the same, then the time to travel any glass path lengths can be simplified to $$t_g = \frac{n_g d_g}{c}$$

where $t_g$ is the glass travel time, $n_g$ is the index of refraction of the glass and $d_g$ is the length of the complete glass light path.

Similarly, the travel time across the air gap between the prisms and the corresponding modulators is equal to:

$$t_{airgap} = \frac{n_{air} d_{airgap}}{c}$$

where $n_{air}$ is the index refraction of air and $d_{airgap}$ is the length of the air gap.

Therefore, recalling that $T=A_1+G_1$, and that $A_2+G_2=T$, then $n_{air}A_1+n_gG_1=n_{airgap}A_2+n_gG_2$. Therefore, since $n_{air}$, $n_g$, $G_1$ and $G_2$ can be determined or measured, it can be seen that once the desired size of face 24 of the red prism 18a is determined, the length of the air gap can be calculated. It is again noted that a two prism system for only two colors can also be arranged according to the teachings of the present invention.

It is again noted that, although the above discussion has been with respect to increasing the red channel clear aperture, the inventive concepts discussed above may be applicable to different color arrangements. For example, as will be appreciated by those skilled in the art, the prism arrangement may be changed so as to swap the red and blue channels.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A prism system for splitting/combining different colors of light comprising:
   a first prism element having a face for projecting and receiving a first color of light;
   a first surface supported substantially parallel and spaced to form an air gap having a length A1 from said face of said first prism;
   a first light path through said prism for said first color having a glass path length G1 through said prism system such that the total path length T for said first color is equal to the length of the air gap A1 plus the glass path length G1 (T=A1+G1);
   another prism element having a face for projecting and receiving another color of light;
   another surface supported substantially parallel and spaced to form an air gap having a length A2 from said face of said another prism element; and
   another path through said prism system for said another color having a glass path length G2 that is different from glass path length G1, glass path length G2 selected such that the total path length T for said another color is the same as the total path length T of said first color (A2+G2=T=A1+G1).

2. The prism system of claim 1 wherein said another glass path length $G_2$ is longer than the length $G_1$ of said first glass path.

3. The prism system of claim 2 wherein an increase in the length of said glass path of said another element results in an increase in the size of said light receiving face of said another element.

4. The prism system of claim 1 wherein said first surface is a first imaging device for providing said first color to said first prism element and said another surface is another imaging device for providing said another color to said another prism element.

5. The prism system of claim 4 wherein said first and another imaging devices are micro mirror imaging devices.

6. The prism system of claim 4 wherein said first and another imaging devices are liquid crystal imaging devices.

7. The prism system of claim 1 further comprising a second prism element having a face for projecting and receiving a second color of light with respect to a second surface supported substantially parallel to and spaced to form an air gap having said length $A_1$ and a second light path for said second color having said glass path length $G_1$ such that the total path length for said first and second colors are equal.

8. The prism system of claim 7 wherein said first element receives blue light, said second element receives green light and said another element receives red light.

9. A three element prism system arranged for splitting/combining three different colors of light comprising:
   a first and second prism elements, each of said first and second elements having a face for projecting and receiving one of a first and second color of light respectively;
   first and second surfaces, each of said first and second surfaces supported substantially parallel and spaced to form an air gap having a length A1 from one of said faces of said first and second prism elements;
   first and second light paths through said arrangement of prism for said first and second colors respectively, both of said first and second paths having a glass path length G1 through said arrangement of prisms such that the total path length T of both said first and second colors is equal to the length of the air gap A1 plus the glass path length G1 (T=A1+G1);
   another prism element having a face for projecting and receiving a third color of light;
   another surface supported substantially parallel and spaced to form an air gap having a length A2 from said face of said another prism element; and
   another path through said prism arrangement for said third color having a glass path length G2 that is different from glass path length G1, glass path length G2 selected such that the total path length T for said third color is the same as the total path length T of said first and second colors (A2+G2=T=A1+G1).

10. The three element prism system of claim 9 wherein said another glass path length $G_2$ is longer than the length $G_1$ of said first glass paths.

11. The three element prism system of claim 10 wherein said first element receives blue light, said second element receives green light and said another element receives red light.

12. The three element prism system of claim 11 wherein said first element receives red light, said second element receives green light and said another element receives blue light.

13. The three element prism system of claim 11 wherein an increase in the length of said glass path of said another element results in an increase in the size of said light receiving face of said another element.

14. The three element prism system of claim 11 wherein said glass path of said blue light is comprised totally of said first element.

15. The three element prism system of claim 14 wherein said glass path of said green light includes a portion of said path through said first element, a portion of said path through said second element, and a portion of said path through said another element.

16. The three element prism system of claim 15 wherein said glass path of said red light includes a portion of said path through said first element and a portion of said path through said another element.

17. The three element prism system of claim 9 wherein said projection and receiving face of said another element is larger than a three element prism system wherein said air gap of said another element is equal to $A_1$ and said glass path of said another element is equal to $G_1$.

18. The three element prism system of claim 9 wherein the overall size of said prism system is smaller than a three element prism system having an air path of said another element equal to $A_1$ and a glass path of said third element equal to $G_1$.

19. The three element prism system of claim 11 wherein said first surface is a first imaging device for providing said first color to said first prism element, said second surface is a second imaging device for providing said second color to said second prism element and said another surface is a third imaging device for providing said third color to said another prism element.

20. The three element prism system of claim 19 wherein said first, second and another imaging devices are mirco mirror imaging devices.

21. The three element prism system of claim 19 wherein said first, second and another imaging devices are liquid crystal imaging devices.

22. A method of projecting different color images to a single display surface comprising the steps of:
   spacing a first image source having a first color to form a first selected air gap having a length $A_1$ from a receiving face of a first element of a prism system;
   spacing another image source having another color to form a second selected air gap having a length $A_2$ from the receiving face of another element of said prism system;
   transmitting light from said first image source along a first path within said prism system toward said display surface, said first path having a glass path length $G_1$;
   transmitting light from said another image source along another path toward said display surface, said another path having a first portion in said first element of said prism system and another portion in said another element of said prism system, said another path having a glass path length $G_2$, said glass path length $G_2$ different than said glass path length $G_1$; and
   adjusting said air gap length $A_2$ such that $A_2$ plus said glass path length $G_2$ is equal to said air gap length $A_1$ plus said glass path length $G_1$.

23. The method of claim 22 further comprising the steps of:
   spacing a second image source having a second color from a receiving face of a second element to form an air gap having said length $A_1$; and
   transmitting light from said second source along a second path through said prism system toward said display surface, said second path having said glass path length $G_1$.

24. The method of claim 23 wherein said first color is blue, said second color is green, and said another color is red.

25. The method of claim 24 wherein said path length $G_2$ is greater than path length $G_1$.

26. A method of projecting different color images to a single display surface comprising the steps of:
   spacing a first image source having a first color and a second image source having a second color to form a first selected air gap having a length $A_1$ from a receiving face of first and second elements respectively, of a three element prism system;
   spacing another image source having another color to form a second selected air gap having a length $A_2$ from the receiving face of another element of said three element prism system;
   transmitting light from said first image source along a first path wholly within said first element of said prism system toward said display surface, said first path having a glass path length $G_1$;
   transmitting light from said second source along a second path toward said display surface, said second path having a first portion in said first element of said prism system, a second portion in said second element of said prism system, and a third portion in said third element of said prism system, said second path having said glass path length $G_1$;
   transmitting light from said another source along another path toward said display surface, said another path having a first portion in said first element of said prism system and another portion in said another element of said prism system, said another path having a glass path length $G_2$, said glass path length $G_2$ different than said glass path length $G_1$; and
   adjusting said air gap length $A_2$ such that $A_2$ plus said glass path length $G_2$ is equal to said air gap length $A_1$ plus said glass path length $G_1$.

27. The method of claim 26 wherein said first color is blue, said second color is green and said third color is red.

28. The method of claim 27 wherein said path length $G_2$ is greater than path length $G_1$.

29. The method of claim 26 wherein said first color is red, said second color is green and said third color is blue.

* * * * *